(12) United States Patent
Wares

(10) Patent No.: US 7,330,821 B2
(45) Date of Patent: Feb. 12, 2008

(54) E-COMMERCE BID AND PROJECT MANAGEMENT SYSTEM AND METHOD FOR THE CONSTRUCTION INDUSTRY

(75) Inventor: Larry Allen Wares, Rancho Santa Margarita, CA (US)

(73) Assignee: Buzzsaw.com, San Francisco, CA (US)

( * ) Notice: Subject to any disclaimer, the term of this patent is extended or adjusted under 35 U.S.C. 154(b) by 1055 days.

(21) Appl. No.: 09/771,142

(22) Filed: Jan. 26, 2001

(65) Prior Publication Data

US 2001/0044768 A1 Nov. 22, 2001

Related U.S. Application Data

(60) Provisional application No. 60/178,825, filed on Jan. 28, 2000.

(51) Int. Cl.
G06F 17/60 (2006.01)
(52) U.S. Cl. .......................................... 705/7; 705/37
(58) Field of Classification Search ................. 705/1, 705/7, 10, 37
See application file for complete search history.

(56) References Cited

U.S. PATENT DOCUMENTS

| | | | |
|---|---|---|---|
| 4,799,156 A | | 1/1989 | Shavit et al. |
| 5,557,780 A * | | 9/1996 | Edwards et al. ............... 703/27 |
| 5,761,674 A * | | 6/1998 | Ito ........................... 707/104.1 |
| 5,905,975 A | | 5/1999 | Ausubel |
| 6,308,164 B1 * | | 10/2001 | Nummelin et al. ............. 705/9 |
| 6,393,410 B1 * | | 5/2002 | Thompson ................... 705/37 |
| 6,446,053 B1 * | | 9/2002 | Elliott ........................ 705/400 |
| 6,581,040 B1 * | | 6/2003 | Wright et al. ................... 705/8 |
| 6,928,396 B2 * | | 8/2005 | Thackston ..................... 703/1 |

FOREIGN PATENT DOCUMENTS

WO     WO 9939291 A1 *  8/1999

OTHER PUBLICATIONS

Dialog "Primavera Extends lead in High-End Project Management Software; Adds Powerful New Features, Functionality to P3." Apr. 1995; Business Wire, p040331181; Dialog file 148, Accession No. 07795988.*

(Continued)

*Primary Examiner*—Romain Jeanty
(74) *Attorney, Agent, or Firm*—Gates & Cooper LLP

(57) ABSTRACT

An integrated electronic commerce (e-commerce) based construction industry bidding and project management system and methods, including document distribution, supply chain automation and on-line auctioning. In a pre-construction setting, the e-commerce based bidding and project management system and method provides for a user the means for participating and competing in the bidding and construction project management tasks using on-line computerized telecommunications technologies. The on-line system and methodologies help the participants to achieve cost efficiencies and performance enhancements that traditional prior art manual bidding and construction management systems and methods have not achieved. In a global system setting the present invention facilitates management of real estate, development, building and construction industries, including architecture, engineering and construction (AEC) project phases, including design, specification, research, bidding, financing, procurement, construction, and maintenance.

10 Claims, 16 Drawing Sheets

OTHER PUBLICATIONS

Alshawi (An IFC Web-Based Collaborative Construction Computer Environment: Wiser), Sep. 1999.*

Sawhney et al (Internet-Based Interactive Construction Management), Dec. 1999, Arizona State University, 9 Pages.*

Dialog "Market for PC project-management software was worth $232 mil in 1992", May 1995, Information Week, n526, p42+,Dialog file 15, Accession 00633757.*

"Buildpoint.com Launches First Web-based Business-to-Business Solution for $415 Billion Construction Materials Industry", PR Newswire, Nov. 1, 1999, Dialog file 20, Accession No. 09021516 (2 pages).

Dialog (R) File 275:Gale Group Computer DB (TM) (c) 2001 The Gale Group. (4 pages).

Dialog (R) File 636:Gale Group Newsletter DB (TM) (c) 2001 The Gale Group. (6 pages).

* cited by examiner

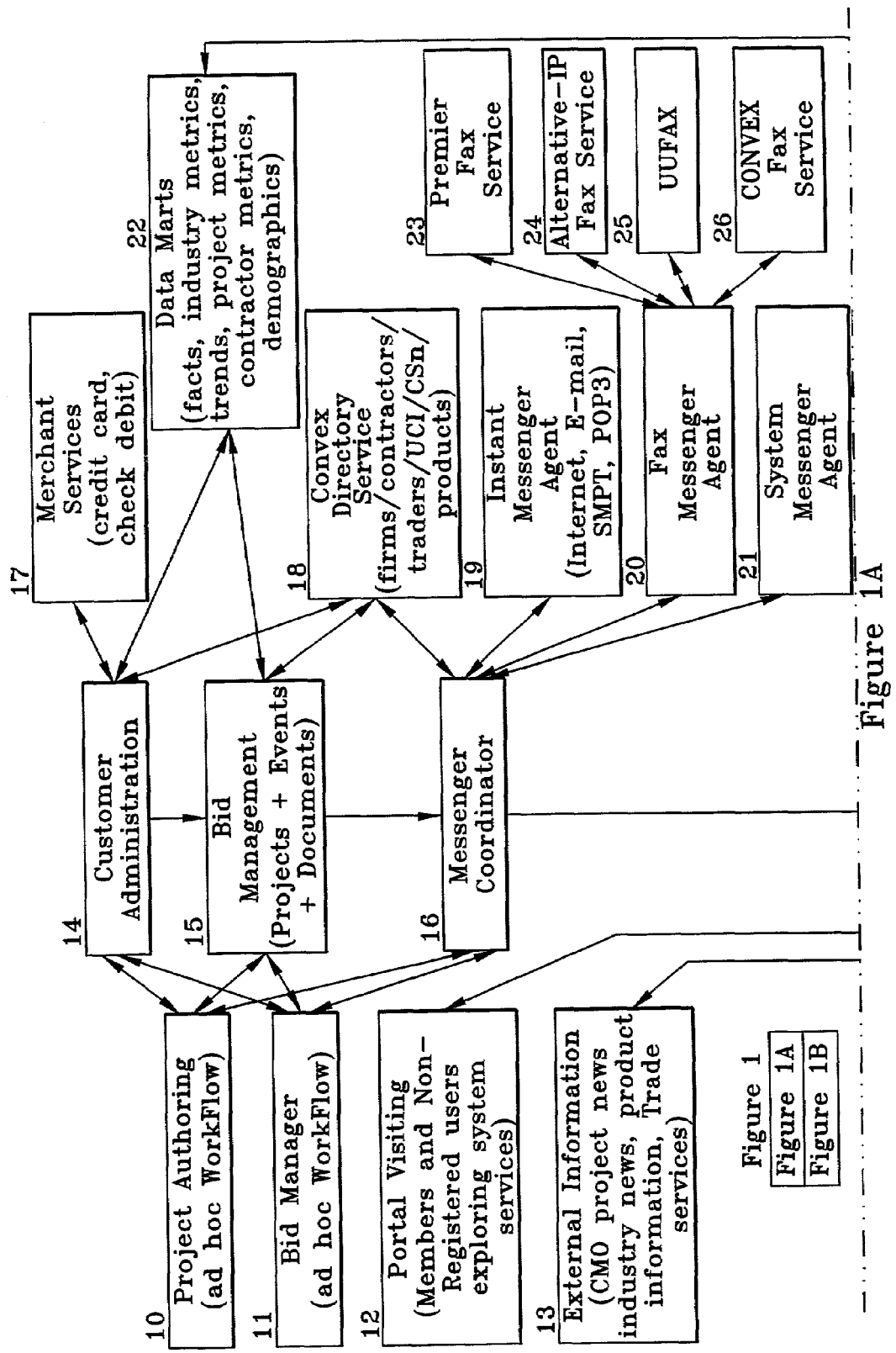

Figure 6

| Home | Project Workspace | | | | |
|---|---|---|---|---|---|
| | Services | Materials | Orange Pages™ | News & views |

*buzzsaw.com*

Bid Manager keeps track of your bid responses. Click Bid Responses on your Project Homepage to see who is going to bid on your project. You can also see who hasn't responded and update any responses that you receive off-line.

- Create a Bid
- Send ITBs
- Track Bid Responses — 94

Responses To Bid

Accepted

| Company | Contact | Response | Bid Amount | |
|---|---|---|---|---|
| 03000 Concrete Subcontractor | | Yes | $60,000.00 | Edit |
| 03110 Farmwork Subcontractor | | Yes | $55,000.00 | Edit |

Not Responded

| Company | Contact | Response | Bid Amount | |
|---|---|---|---|---|
| 00000 No Trade | | | | Edit |

About Buzzsaw.com | Contact Us | Privacy Policy | Terms of Use

| Home | Project Workspace | Services | Materials | Orange Pages™ | News & views | buzzsaw.com

- Log In
- Register Now

Search [____] All Buzzsaw.com ▶

[↑] [Find it!]

What do you think?
Give us your feedback on our site and services!

Welcome, kelley crossman.
(if your not kelley crossman, click here)
Buzzsaw.com is the fastest growing project workspace for everyone in the construction industry.

Higlights
>Orange Pages—
>Buzzsaw.com

WORK BETTER
>Manage projects online
>Host online team meetings
>Print plan sets

FIND PEOPLE AND PRODUCTS
>
>

BUILD YOUR BUSINESS
>
>

Start a Project Now! Click Here

STAY INFORMED
>
>
>

BUZZSAW.COM NEWS AND EVENTS
>
>

CONNECT WITH BUZZSAW.COM
>
>

About Buzzsaw.com | Contact Us | Privacy Policy | Terms of Use

E-COMMERCE BID AND PROJECT MANAGEMENT SYSTEM AND METHOD FOR THE CONSTRUCTION INDUSTRY

CROSS-REFERENCE TO RELATED APPLICATIONS

This application claims the benefit of Provisional Application 60/178,825, entitled E-COMMERCE BID AND PROJECT MANAGEMENT SYSTEM AND METHOD FOR THE CONSTRUCTION INDUSTRY, filed Jan. 28, 2000.

FIELD OF THE INVENTION

The present invention relates to real estate, development, building and construction industry project management systems and methods. More particularly, the present invention relates to electronic commerce (e-commerce) based construction industry project management systems and methods. Even more particularly, the present invention relates to electronic commerce (e-commerce) based bidding and project management systems and methods, including document distribution, supply chain automation and on-line auctioning for private and public works projects.

BACKGROUND OF THE INVENTION

The bid process experienced by today's construction industry is a result of nearly 150 years of adversarial bidding and while the projects and players may differ from bid to bid, the goal remains unchanged which is to obtain the lowest possible price for the best possible materials and labor. Byproducts created from the evolution of this process were eventually converted to bid practice standards which include, by example, a final deadline for bid submission at 2:00 PM. In addition to bid submission standards, architects and engineers believed that organization of the bid documents by trade discipline would result in better bids. In a public works environment, projects are open to anyone and everyone that qualifies to bid the project which creates a highly adversarial bid environment. Similarly, in a private ownership bid environment where more than one General Contracting bid is desired, also creates a highly adversarial bid environment amongst general contractors and subcontractors. Lastly, in an negotiated bid environment, an owner places confidence in a single General Contractor who will solicit bids from qualified subcontractors and suppliers (a team effort) which tends to be a non-adversarial bidding environment. The trend in the industry is to utilize the negotiated bidding environment. Today, plans and specifications are prepared in a way that enables all participants to narrow down their required scope of work and submit a qualified bid. However, although a negotiated bid environment is utilized in pre-construction phases, the construction industry traditionally relies on manual methods of bid collaboration, and dissemination of information and results. The bid manager's task is enormous and highly susceptible to inefficiencies and inaccuracies due to the predominantly manual means employed for completing the bidding task. Further, the construction industry professionals traditionally get bogged down with the multitude of tasks that not only have to be managed during the pre-construction bidding cycle, but also the multitude of tasks that have to be managed during the construction phase after the contract has been let. While the construction industry bidding process is well known, and is directed at obtaining the lowest possible price for the materials and labor, the bidding management tasks have not been centralized for being comprehensively manipulated by available computer technology. Additionally, the subsequent functions, such as building, construction and facilities, and maintenance, that need to be managed to track and monitor the construction project to completion are also limited to manual means.

By example, in the pre-construction phase discussed above, the construction industry bidding task traditionally concerns: a) an owner purchasing land and employing the services of an architect and other consultants, b) an architect employs services of specialty engineers and consultants, c) an architect prepares bid documents concerning the construction project involved, d) architects and owners seek low bids from qualified general contractors, e) general contractors seek low bids from qualified subcontractors and suppliers, f) subcontractor seek low bids from suppliers, wholesalers and building products manufacturer, g) suppliers and wholesalers seek low bids from specified building product manufactures, h) building product manufacturers submit bids, i) suppliers and wholesalers submit bids, j) subcontractor submits bid, and k) general contractors submit an all-inclusive bid. The activities involved by each bidder, by example providing specifications, plans and drawings, for winning the lowest bid are intense and involves an enormous amount of manual manipulation and dissemination of information by each bid participant.

Thus, while there may be isolated computerized database for specifications, plans and drawings at the individual construction project participant's location, to applicant's knowledge, there are no known integrated bidding and project management systems, other than the aforementioned non-integrated manual systems for manipulation and dissemination of information.

Accordingly, a need is seen to exist for a system for managing each phase of real estate, development, building and construction industries, including architecture, engineering and construction (AEC) projects. This system should preferably include an integrated solution composed of a modular set of services where various project data and workflow is shared between the modular services. These services should be used individually or as part of the integrated solution. This system facilitates collaboration between intra- and inter-company participants wherein project data and workflow may be accessed and manipulated electronically via the Internet. In addition, this system should interface to traditional non-Internet based processes of AEC project management via printing, scanning, e-mail, FAX in/out, file import/export, or forms of import/export. From a more global perspective, a need is seen to exist for a system that facilitates managing real estate, development, building and construction industries, including architecture, engineering and construction (AEC) project phases, including design, specification, research, bidding, financing, procurement, construction, and maintenance. The services provided by the system should be integrated and include, by example, document management, document viewing, document redlining, account management, permissions management, contact management, design professional directories, bidding process management, construction administration management, and reprography services.

Further, a need is also seen to exist for an e-commerce based bidding and construction project management system and method, whereby, a variety of integrated bidding and construction project related modules are provided to the construction community for being manipulated using on-line computerized telecommunications technologies, known as the Internet, for being disseminated to the various participants in a construction project.

It is therefore a primary object of the present invention to provide an integrated e-commerce based bidding and construction project management system and method applicable to both private and public works projects, whereby, a variety of bidding and construction project related databases are provided to the construction community for being manipulated using on-line computerized telecommunications technologies, known as the Internet.

Another object of the present invention is to provide an integrated electronic commerce (e-commerce) based construction industry bidding and project management system and methods applicable to both private and public works projects, including document distribution, supply chain automation and on-line auctioning.

Yet another object of the present invention is to provide a system for managing each phase of real estate, development, building and construction industries, including architecture, engineering and construction (AEC) projects. The system includes an integrated solution composed of a modular set of services where various project data and workflow are shared between the modular services. These services are used individually or as part of the integrated solution. The system facilitates collaboration between intra- and inter-company participants wherein project data and workflow may be accessed and manipulated electronically via the Internet. In addition, the system interfaces to traditional non-Internet based processes of AEC project management via printing, scanning, e-mail, FAX in/out, file import/export, or forms of import/export.

Still another object of present invention is to provide a global system that facilitates managing real estate, development, building and construction industries, including architecture, engineering and construction (AEC) project phases, including design, specification, research, bidding, financing, procurement, construction, and maintenance. The system services are integrated and include, by example, document management, document viewing, document redlining, account management, permissions management, contact management, design professional directories, bidding process management, construction administration management, and reprography services.

BRIEF SUMMARY OF THE INVENTION

Accordingly, the foregoing objects are accomplished by an integrated electronic commerce (e-commerce) based construction industry bidding and project management system and method, including document distribution, supply chain automation and on-line auctioning. In a pre-construction setting, the e-commerce based bidding and project management system and method of the present invention provides for a user, such as an owner, and architect, engineer, consultant, general contractor, sub-contractor, retail and wholesale supplier and building products manufacturer, the means for participating and competing in the bidding and construction project management tasks using on-line computerized telecommunications technologies, known as the Internet, fully integrated with conventional telecommunications means such as facsimile transmission. The on-line system and methodologies of the present invention, help the participant to achieve cost efficiencies and performance enhancements that traditional prior art manual bidding and construction management systems and methods have not achieved.

The present invention provides a system for managing each phase of real estate, development, building and construction industries, including architecture, engineering and construction (AEC) projects. The system includes an integrated solution composed of a modular set of services where various project data and workflow are shared between the modular services. These services are used individually or as part of the integrated solution. The system facilitates collaboration between intra- and inter-company participants wherein project data and workflow may be accessed and manipulated electronically via the Internet. In addition, the system interfaces to traditional non-Internet based processes of AEC project management via printing, scanning, e-mail, FAX in/out, file import/export, or forms of import/export.

The present invention also provides a global system that facilitates managing real estate, development, building and construction industries, including architecture, engineering and construction (AEC) project phases, including design, specification, research, bidding, financing, procurement, construction, and maintenance. The system services are integrated and include, by example, document management, document viewing, document redlining, account management, permissions management, contact management, design professional directories, bidding process management, construction administration management, and reprography services.

Other features of the present invention are disclosed or apparent in the section entitled "DETAILED DESCRIPTION OF THE INVENTION".

BRIEF DESCRIPTION OF THE SEVERAL VIEWS OF THE DRAWING

For fuller understanding of the present invention, reference is made to the accompanying drawing in the following Detailed Description of the Invention. In the drawing:

FIG. 6 shows an example web page for a portal visitor who selected an on-line project management information category from the home page.

FIG. 9 shows an example web page for a portal visitor who selected a bid tracking category from the web page of FIG. 7.

FIG. 10 shows an example web page for a portal visitor who selected a general information category from the home page of FIG. 5.

FIG. 12 shows an example web page created for a new user of the present system.

FIG. 13 shows an example web page for a new user using the present system for starting a new project.

Figure 1B:
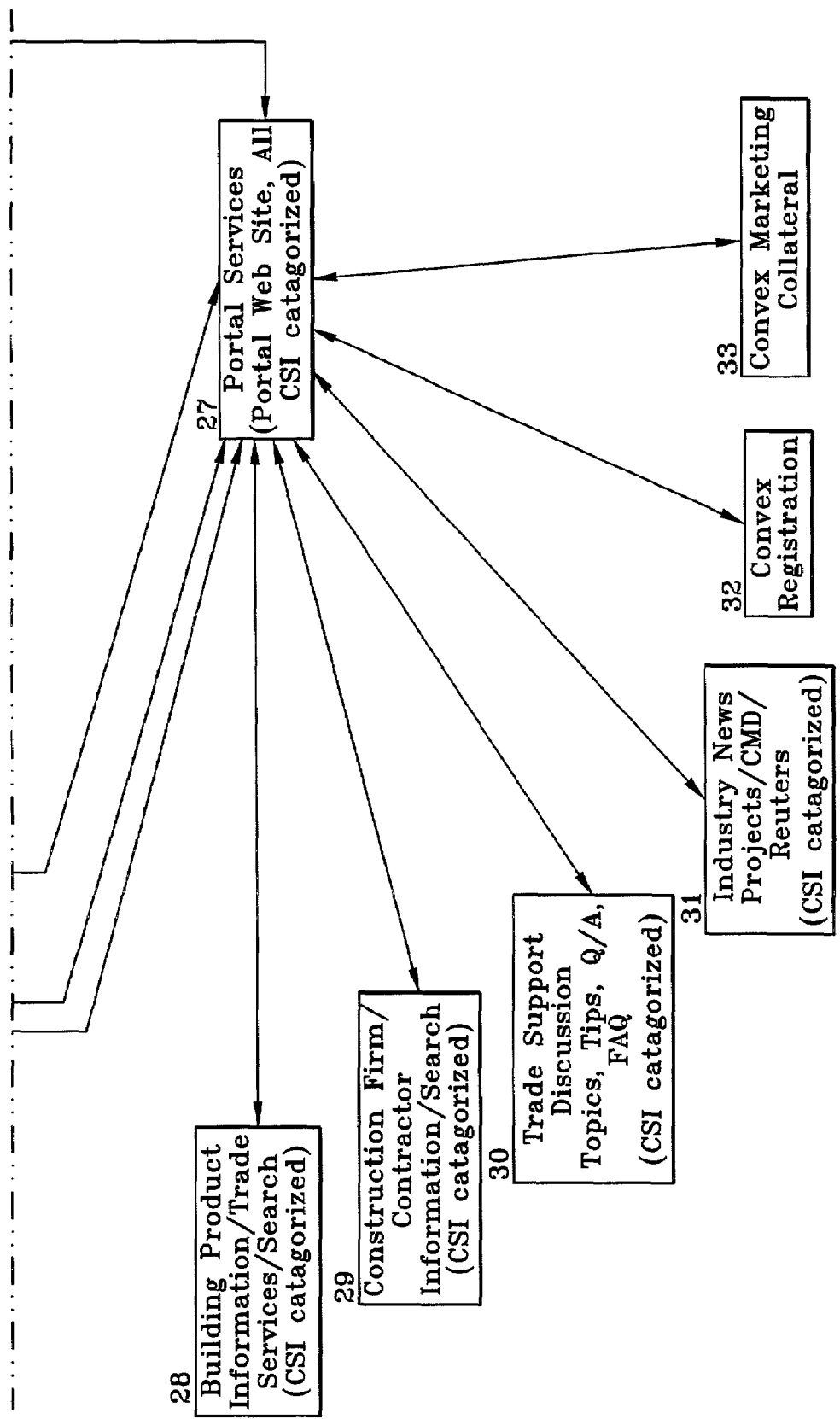
FIG. 1 shows a composite diagram of the general system design of the present invention.

Reference numbers refer to the same or equivalent parts of the present invention throughout the several figures of the drawing.

DETAILED DESCRIPTION OF THE INVENTION

The present invention encompasses an integrated electronic commerce (e-commerce) based construction industry bidding and project management system and methods, including document distribution, supply chain automation and on-line auctioning. In a pre-construction setting, the e-commerce based bidding and project management system and method of the present invention provides for a user, such as an owner, and architect, engineer, consultant, general contractor, sub-contractor, retail and wholesale supplier and building products manufacturer, the means for participating and competing in the bidding and construction project management tasks using on-line computerized telecommunications technologies, known as the Internet. The on-line system and methodologies help the participants to achieve cost efficiencies and performance enhancements that traditional prior art manual bidding and construction management systems and methods have not achieved. References in the following discussion to the program name, CONVEX, is illustrative of a presently preferred program and is not intended to limit the present method to a specific computer program.

Referring now to FIG. 1, a system design overview is shown. A summary of the features of each module of FIG. 1 is provided below. The system design leverages some common reoccurring patterns in the bidding process, ultimately facilitating communication between business entities in a semi-structured manner. The design focuses on the collaboration of objects to facilitate communication.

Module 10, Project Authoring, represents generally the work performed by the A&E 2. Authoring 10 includes designing a project on an identified site, including all plans and documents that define the project. Authoring 10 includes preparing an initial bid package and any revisions necessary. The bid package will typically identify specific trades and material standards. Similar authoring activities are iteratively performed at each level in the bidding hierarchy shown in FIG. 1 as each level translates as necessary the upper level bid documents to meet the needs of a lower level bidder.

Module 11, Bid Manager, represents the individual assigned to oversee the bid process for a specific project. The bid manager approves and provides project-specific inputs to the various databases as appropriate for the project.

Module 12, Portal Visiting, represents any user visiting the system for information. Such visitors may be either registered members participating in the bidding or project management process or non-registered users exploiting the system services which are available to the general public. Portal visitors will see computer screens such as shown in FIGS. 5-10 and described below.

Module 13, External Information, represents a general database of public information such as lists of available bid packages, industry news, trade services and the like.

Module 14, Customer Administration, represents the data gathering process of qualifying firms to participate in the bidding process (Members). This process will generate a database of qualified Members, indicating their services, capabilities, special categories under business laws, and administrative information.

Module 15, Bid Management, represents the central software program which provides data routing information, executes the various program functions, and executes commands received from the bid manager.

Module 16, Messenger Coordinator, represents a submodule of Bid Management 15 associated with routing correspondence such as email and facsimiles associated with the bid process.

Module 17, Merchant Services, represents the fiscal services necessary to transact and confirm funds transfers between the members.

Module 18, CONVEX Directory Services, represents a submodule of Bid Management 15 associated with management of the construction project related databases of businesses and products associated with the specific project.

Module 19, Internet Messenger Agent, represents the Web Application Server selected to provide Internet connectivity for on-line computerized communications of text and electronic images between the members and the system of the present invention.

Module 20, Fax Messenger Agent, represents the FAX management service selected to provide facsimile document distribution service connectivity between the members and the system of the present invention.

Module 21, System Messenger Agent, represents a subroutine of Messenger Coordinator 16 for record keeping purposes.

Module 22, Data Marts, represents a general database of information applicable to projects in general. This database provides a common information source for members to access in preparing their bids.

Module 23, Premiere Fax Service, represents a preferred facsimile service selected to provide fax service to members for downloading documents.

Module 24, Alternative IP Fax Service, represents a secondary facsimile service selected to provide fax service to members for downloading documents.

Module 25, UUFAX, represents an example of a suitable facsimile service for implementing the CONVEX system.

Module 26, CONVEX Fax Service, represents the capability to utilize a dedicated, CONVEX related facsimile service if necessary.

Module 27, Portal Services, represents a security function to allow members access to the portion of the system for which they have authorization but restrict non-members only to those portions available to the public, such as general databases.

Module 28, Building Product Information/Trade Services/Search, represents a specific searchable database, categorized by Construction Services Institute (CSI) codes, for use by either members or non-members for supply schedule and cost information, and for members participating in a specific project, potential automation of the supply chain after award of contracts.

Module 29, Construction Firm/Contractor Information/Search, represents a specific searchable database, categorized by CSI codes, for use by either members or non-members.

Module 30, Trade Support Discussion, represents a specific searchable database, categorized by CSI codes, for use by either members or non-members.

Module 31, Industry News Projects/CMD/Reuters, represents a specific searchable database, categorized by CSI codes, for use by either members or non-members.

Module 32, CONVEX Registration, represents a public database of information on how non-member portal visitors can become members.

Module 33, CONVEX Marketing Collateral, represents a public database of information on how the CONVEX system can be utilized.

Figure 2:
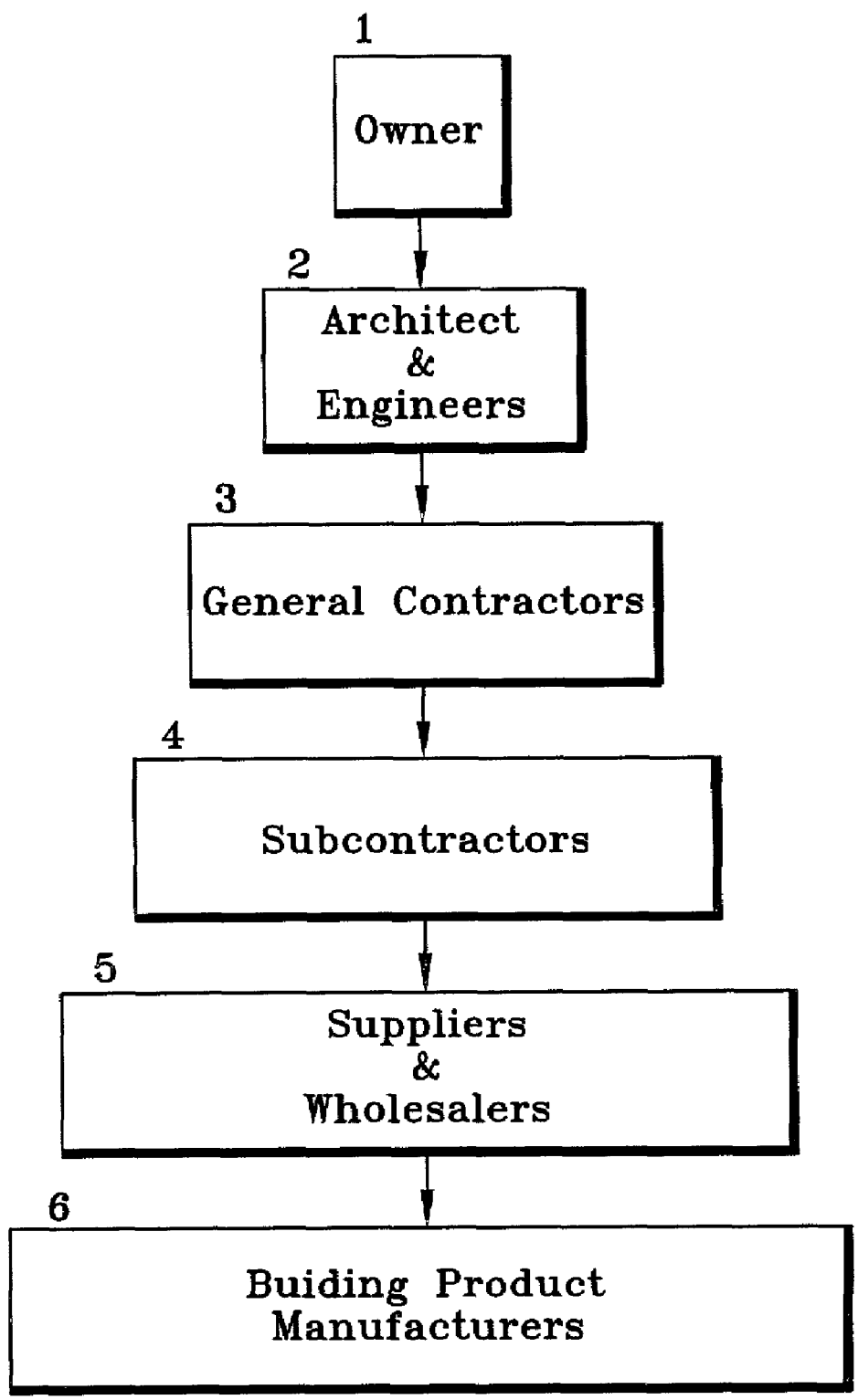
FIG. 2 shows a simplified block diagram of the hierarchy of the participants in the bidding process.

Referring now to FIG. 2, the expected users of the present invention are summarily identified. Owners 1 represent any of the group of single entities, partnerships and joint ventures, corporations, and government agencies. The present invention will allow the owners 1 to monitor the progress of the bidding process for overall management purposes. Architects and Engineers 2 (A&E) provide project design, requests for proposals or bids, preparation of bid information or requirements, management of the bid process, and upon approval by owners 1, management of resulting contracts. Additionally, the A&E frequently provide a quality control function during execution of the contract.

General Contractors 3 (GC) represent the group of qualified companies who wish to win the resulting contract. During the bidding process, more than one GC will be participating. Subcontractors 4 are generally trades and specialty contractors who will do the actual work. During the bidding process, subcontractors 4 may submit bids to more than one GC 3. These bids may or may not be the same, at the discretion of the subcontractor. Each subcontractor 4 will solicit bids from individual suppliers and wholesalers 5 at his or her discretion. Building product manufacturers 6 will provide pricing information to their associated wholesalers and suppliers 5. The present invention allows for bid information to flow upward in the chain of participants but restricts lateral flow of information based on a need to know and, if appropriate, laws and regulations affecting the request for bids.

Figure 3:
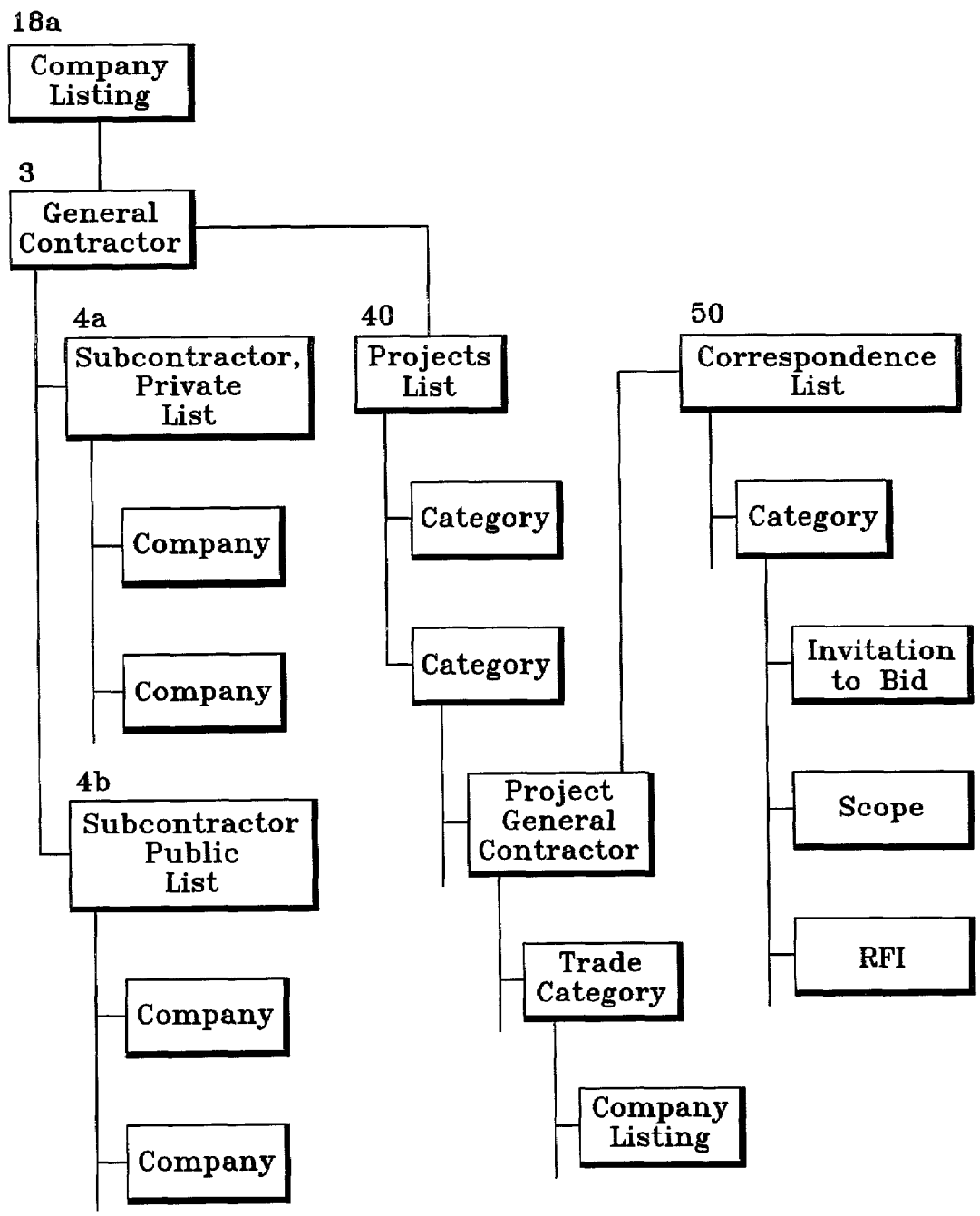
FIG. 3 shows the object hierarchy related to the system domain functionality.

Referring now to FIG. 3, the system domain object hierarchy is shown. FIG. 3 depicts the types of objects, or classes of objects, in the system. It is expected that there will be multiple instances of many of the objects. FIG. 3 shows the object inheritance relationships. For example, a General Contractor object is a type of Company object, which in turn is a type of Entity object. The General Contractor is said to inherit from the Company object. This means that the Company object will have certain data and functionality that will be available to all of its subclasses, such as General Contractor. In this manner, a specific piece of functionality will only show up once in the system database but will be shared by all objects that need to use it. A similar relationship exists in significant utility objects such as e-mail and fax objects. A summary of the features of each module of FIG. 3 is provided below.

Module 18a, Company Listing, represents the data within CONVEX Directory Service 18 database that pertains to a specific company.

Module 3, General Contractor, represents a specific entity, which may be a separate company or a division of a larger company, that functions as a general contractor in construction projects. Data pertinent to the GC function also resides within CONVEX Directory Service 18 database, either as a separate entity or as an identified subset of a larger portion of the database.

Module 4a, List, represents an address database of specific companies with, for example, similar capabilities or services. This allows the CONVEX system to access the central or shared database, without requiring a large separate database.

Module 4b, List, represents all additional address databases of specific companies in the manner of List 4a.

Module 40, Projects, represents a searchable database of addresses within the CONVEX Directory Service 18 database where, for example, project information may be found. Again, by using searchable databases of addresses, arranged by common characteristics, a variety of searches are available to users for compiling information suitable for either bidding or project management.

Module 50, Correspondence, represents a searchable database of correspondence records maintained within the CONVEX records database. This allows members to retrieve records as needed for either project management or preparing bids for new projects.

Figure 4:
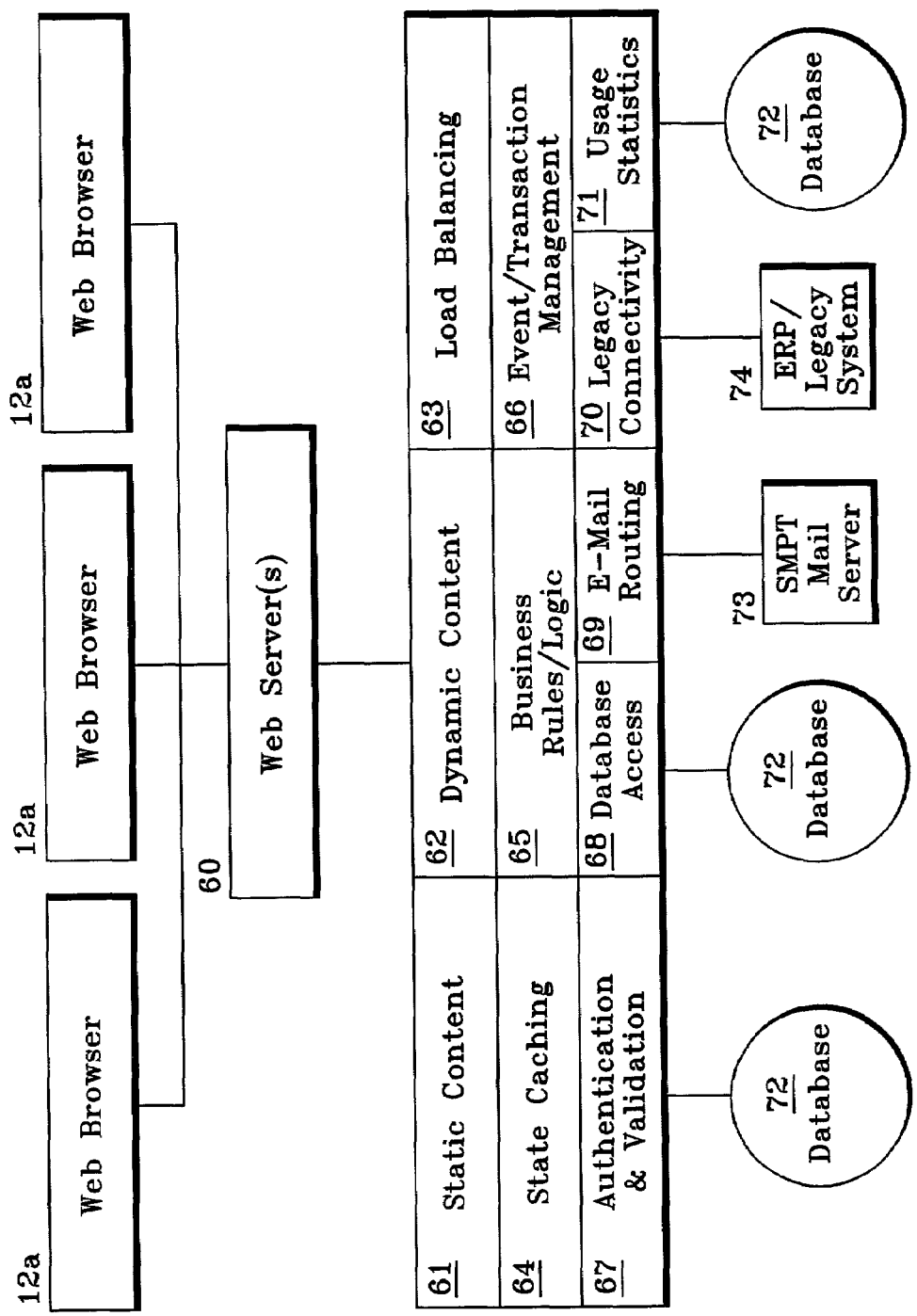
FIG. 4 illustrates a summary of the preferred characteristics of acceptable web application servers for the present invention.

Referring now to FIG. 4, the preferred characteristics of web application servers, suitable for implementation of the CONVEX system, are shown. CONVEX may be adapted to run with any server and is not, therefore, limited to any specific server.

At a high level, the server should have the following characteristics:
- The ability to provide web pages quickly in response to user requests,
- System availability to users at all times, with minimal down or dead time,
- Capacity for a large number of users,
- User-friendly, non technically challenging web pages,
- Operates without legacy systems,
- Operates with only one back-end database,
- Capable of sending e-mails and faxes.

A summary of the features of each module of FIG. 4 is provided below.

Module 12a, Web Browser, represents the variety of browsers used by the users visiting the system, or portal visiting 12.

Module 60, Web Server, represents the selected server computer chosen to operate the CONVEX system.

Module 61, Static Content, represents the relatively unchanging portion of the system database.

Module 62, Dynamic Content, represents the active portion of the system database.

Module 63, Load Balancing, represents the management portion of the system software and database.

Module 64, State Caching, represents the subroutine of the web application server 60 associated with managing the static portion of the CONVEX database.

Module 65, Business Rules/Logic, represents the subroutine of the web application server 60 associated with managing the dynamic portion of the CONVEX database.

Module 66, Event/Transaction Management, represents the subroutine of the web application server 60 associated with managing the load balancing portion of the CONVEX program.

Module 67, Authentication & Validation, represents rules and practices established by the security subroutine of the CONVEX software such as Portal Services 27, shown in FIG. 1.

Module 68, database Access, represents rules and practices established by the system management subroutine of the CONVEX software such as Bid Management 15, shown in FIG. 1.

Module 69, E-mail Routing, represents rules and practices established by the e-mail system management subroutine of the CONVEX software such as Internet Messenger Agent 19, shown in FIG. 1.

Module 70, Legacy Connectivity, represents rules and practices established by the communications management subroutine of the CONVEX software such as Messenger Coordinator 16, shown in FIG. 1.

Module 71, Usage Statistics, represents a systems management record keeping function for system evaluation and, if indicated, modification.

Module 72 represents applicable sub sections of the central database wherein data appropriate for each function may be found.

Module 73, SMTP Mail Server, represents a simple mail transfer protocol for sending e-mail messages between servers.

Module 74, ERP/Legacy System, represents a subroutine for enterprise resource planning, a business management system that integrates all facets of the business, including planning, manufacturing, sales, and marketing.

In the following discussion, reference is made to unique project-specific information. This reference is intended to refer only to that information prepared for a project during project authoring 10 and the project-specific documents prepared in response thereto. This reference does not negate or replace the common information databases and the sharing functions thereof discussed above in regard to FIGS. 1-4.

Figure 5:
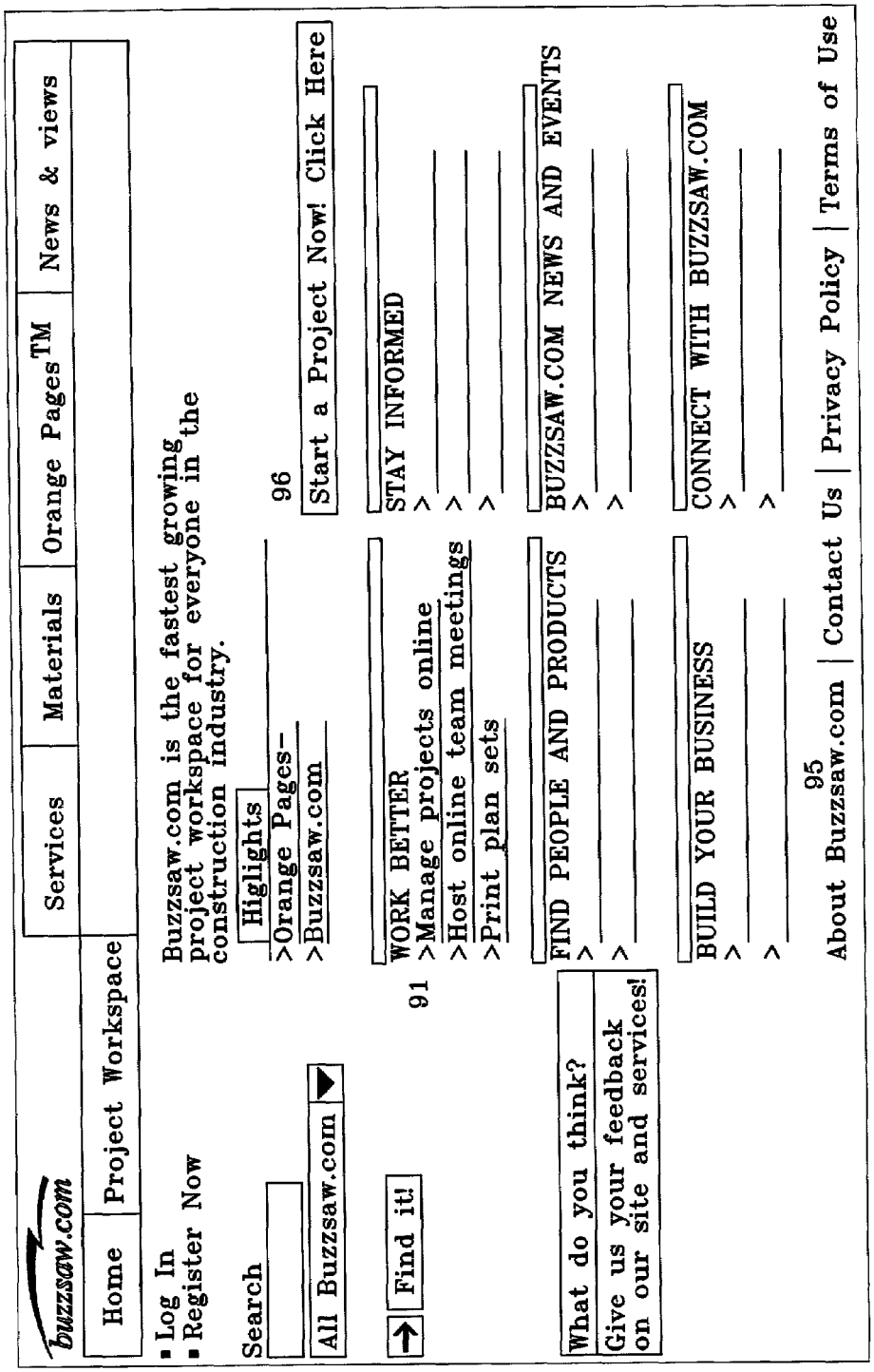
FIG. 5 shows an example home page for the present invention.

Referring now to FIG. 5, an example of a web home page suitable for management of the present system is shown. For example, a portal visitor 12 accesses the system home page of FIG. 5 by entering an address of the system manager, in this example "buzzsaw.com". Through use of a suitably structured home page as is known in the art, a portal visitor 12 can access a variety of information sources. If a new user selects, in this example, "Manage projects online" 91, the web page of FIG. 6 is displayed.

Figure 6:
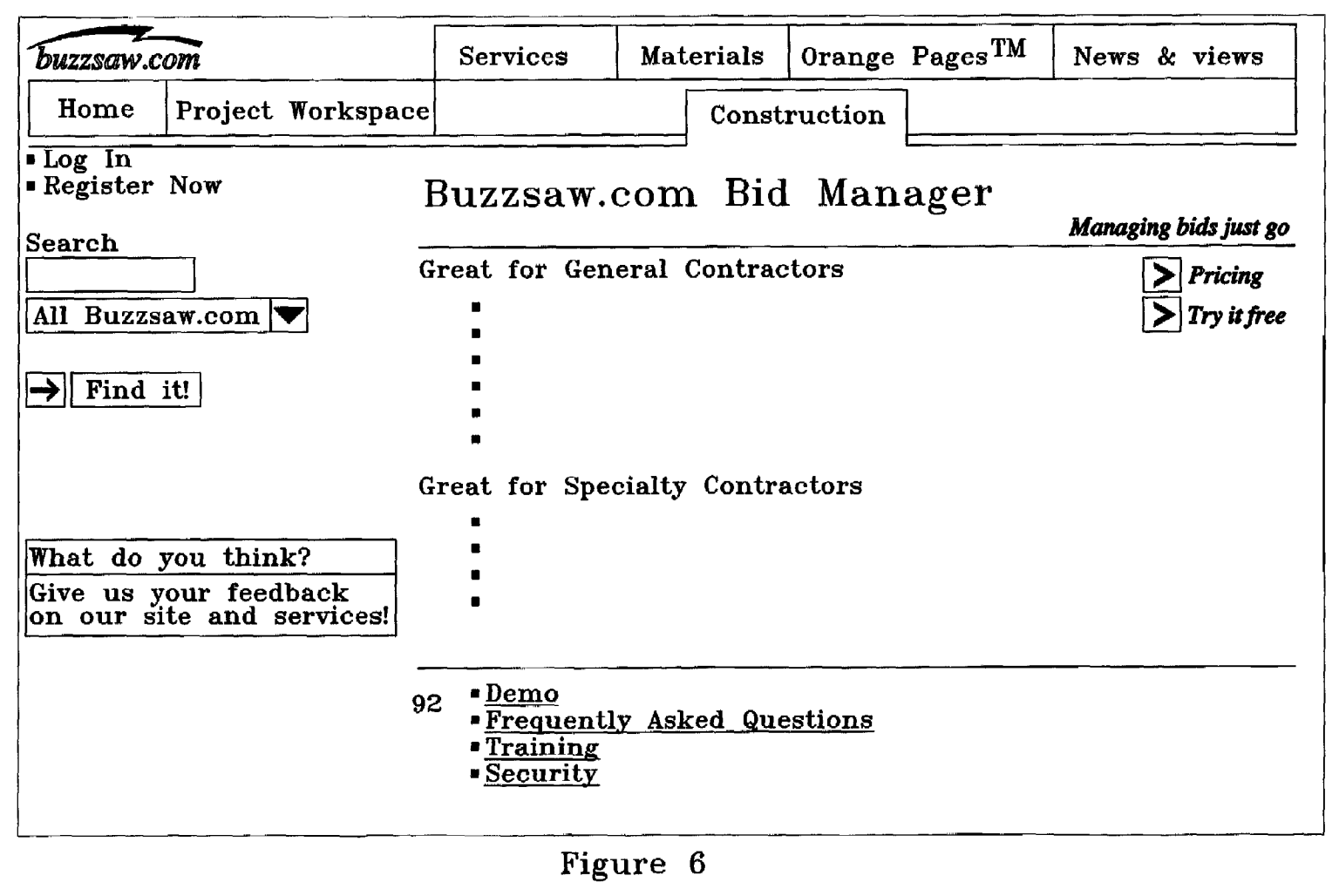

Referring now to FIG. 6, an example of a web page suitable for introduction of a new user of the present system is shown. If a new user desires more information about the E-COMMERCE BID AND PROJECT MANAGEMENT SYSTEM AND METHOD FOR THE CONSTRUCTION INDUSTRY, a demonstration 92 may be selected, resulting in the displaying of the web page of FIG. 7.

Figure 7:
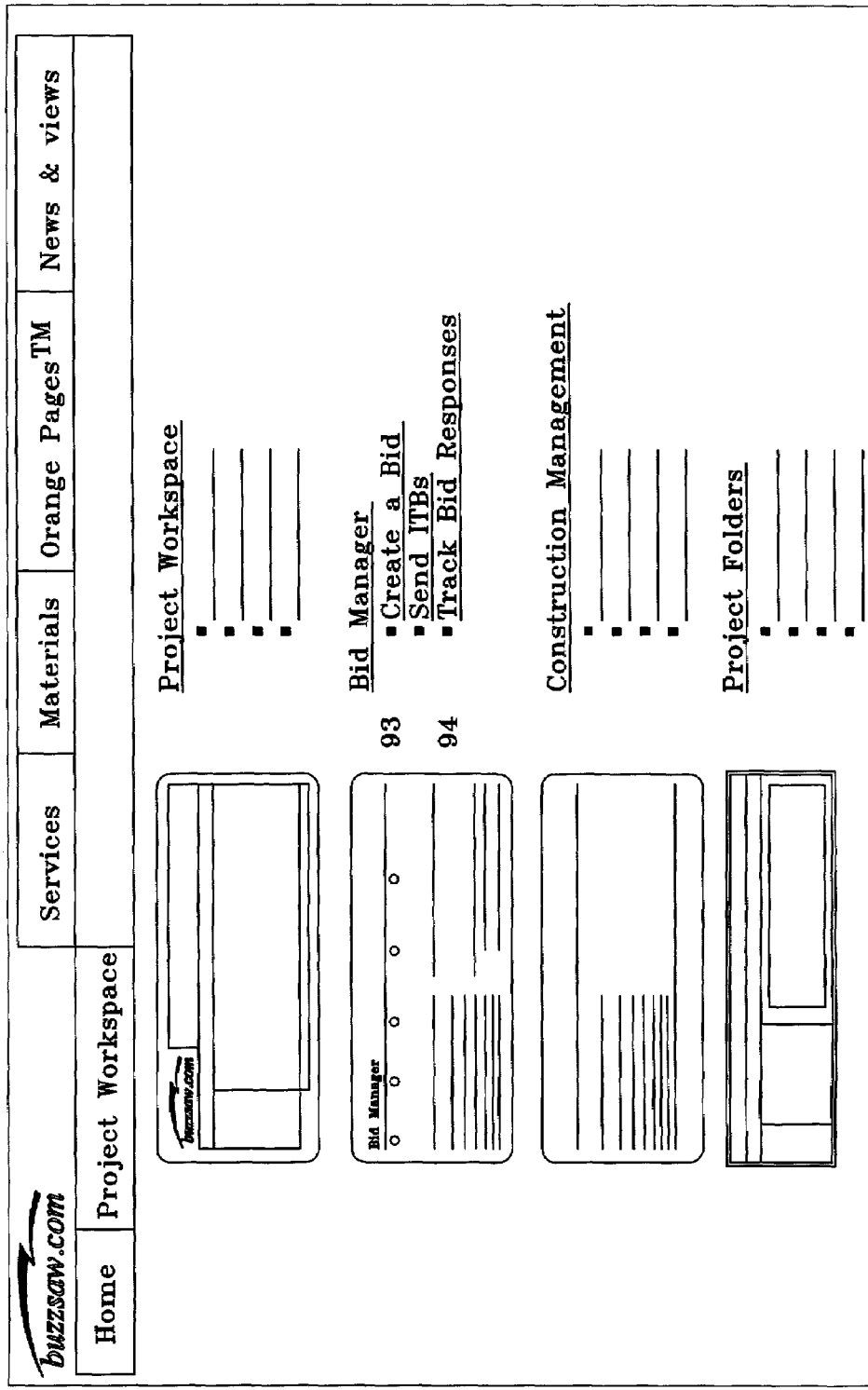
FIG. 7 shows an example web page for a portal visitor who selected a system demonstration category from the web page of FIG. 6.

Referring now to FIG. 7, an example is shown of a web page suitable for displaying the options available to a user of the present system. Linkages to useful services and tools provided by the present system are arranged in logical groups, selectable by the user as desired. For example, if the user select "Create a Bid 93 in the Bid Manager group, the web page of FIG. 8 is displayed.

Figure 8:
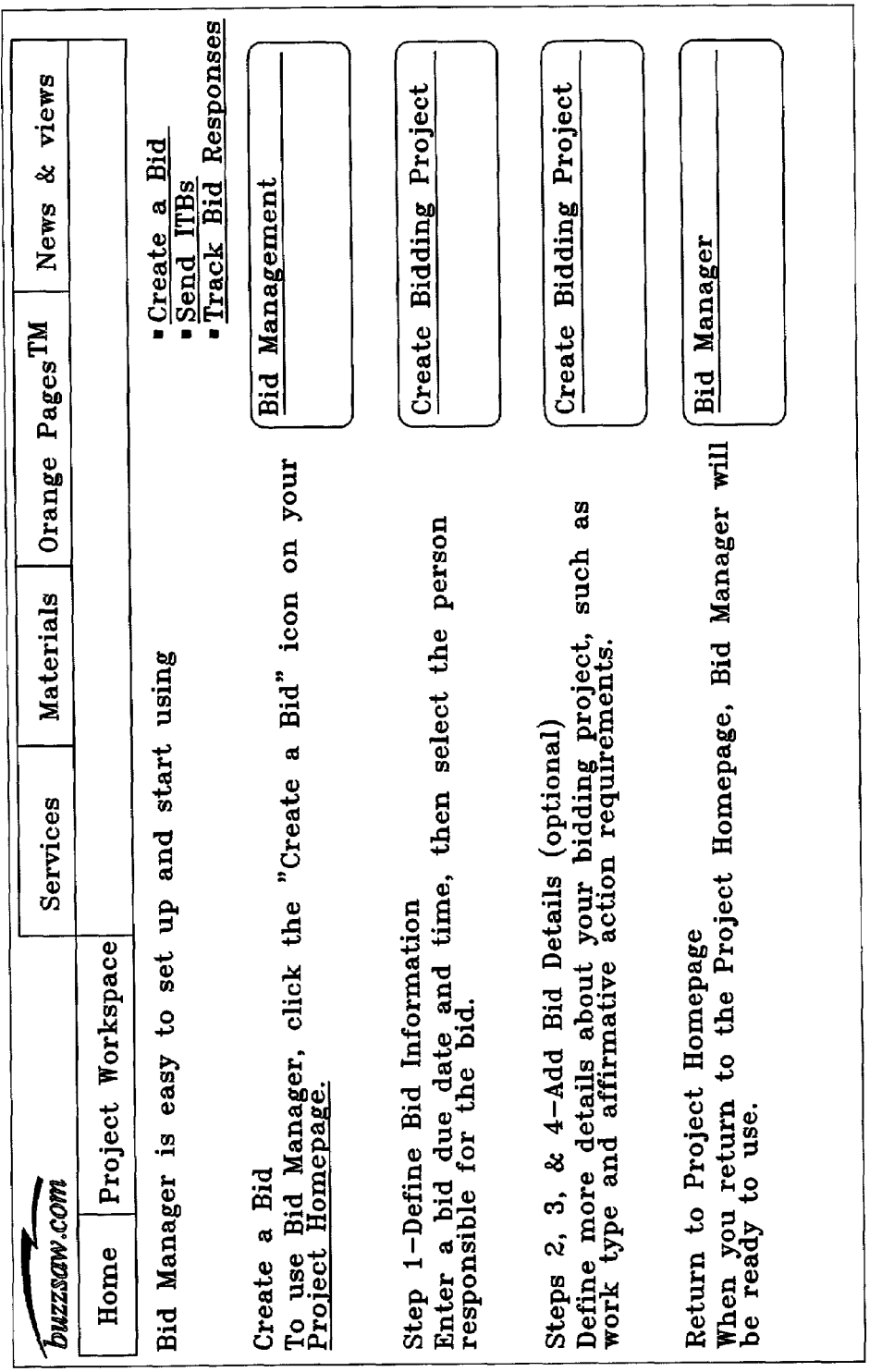
FIG. 8 shows an example web page for a portal visitor who selected a bid creation category from the web page of FIG. 7.

Referring now to FIG. 8, an example web page suitable for preparing a bid using the present system is shown. This and subsequent web pages or "screens" lead the user through the steps necessary to prepare and present a bid in a user-friendly manner. The specific information to be entered in a bid is unique to each project and need not be discussed further for explanation of the present system.

Referring now to FIG. 9, an example web page suitable for tracking the response status for bids is shown. If a user selects "Track Bid Responses" 94 from the example screen of FIG. 7, the screen of FIG. 9 is displayed. This and subsequent web pages or "screens" allow the user to monitor and manage bid responses in a user-friendly manner. The specific information resulting from the bidding process is unique to each project and need not be discussed further for explanation of the present system.

Figure 10:
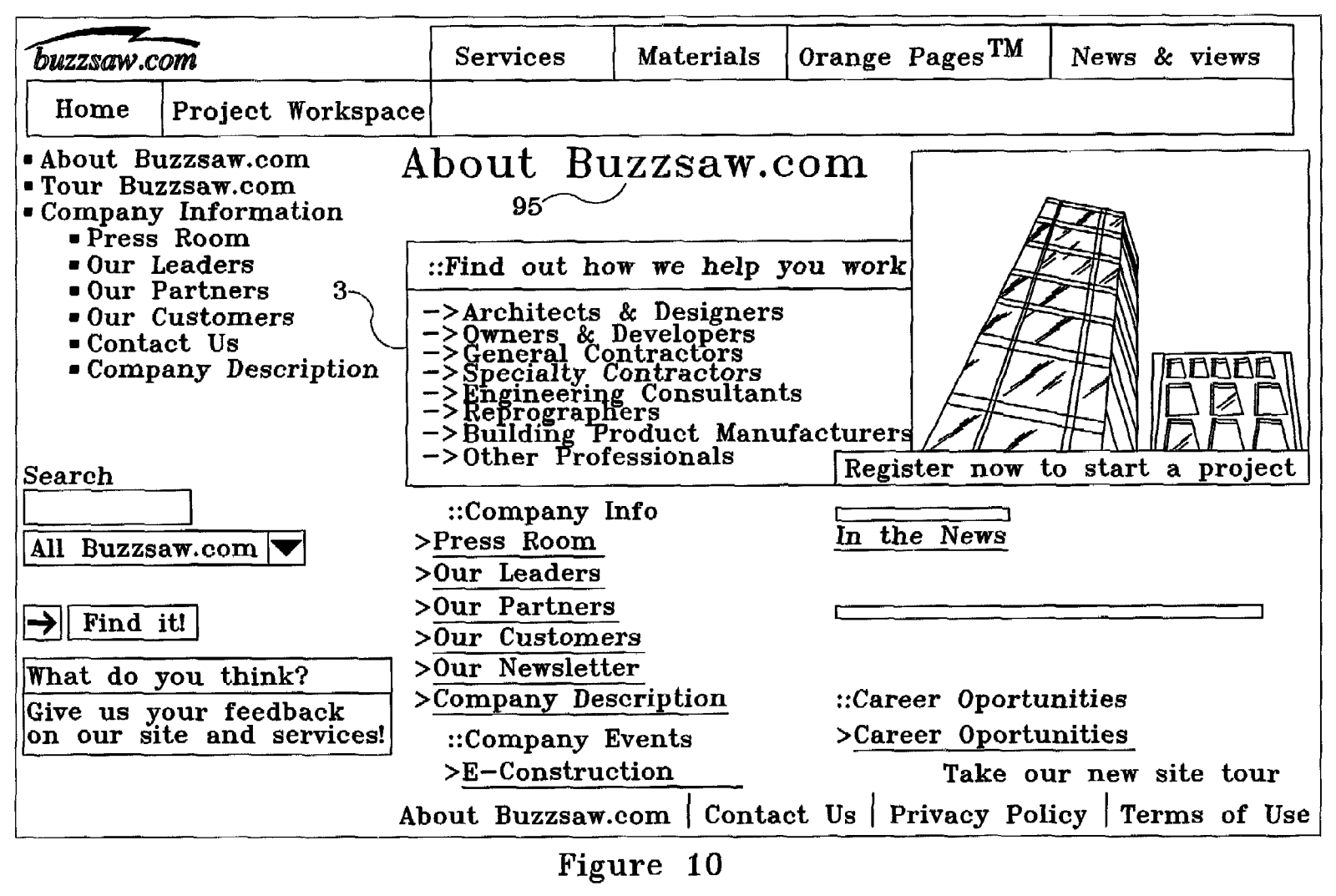
Figure 11:
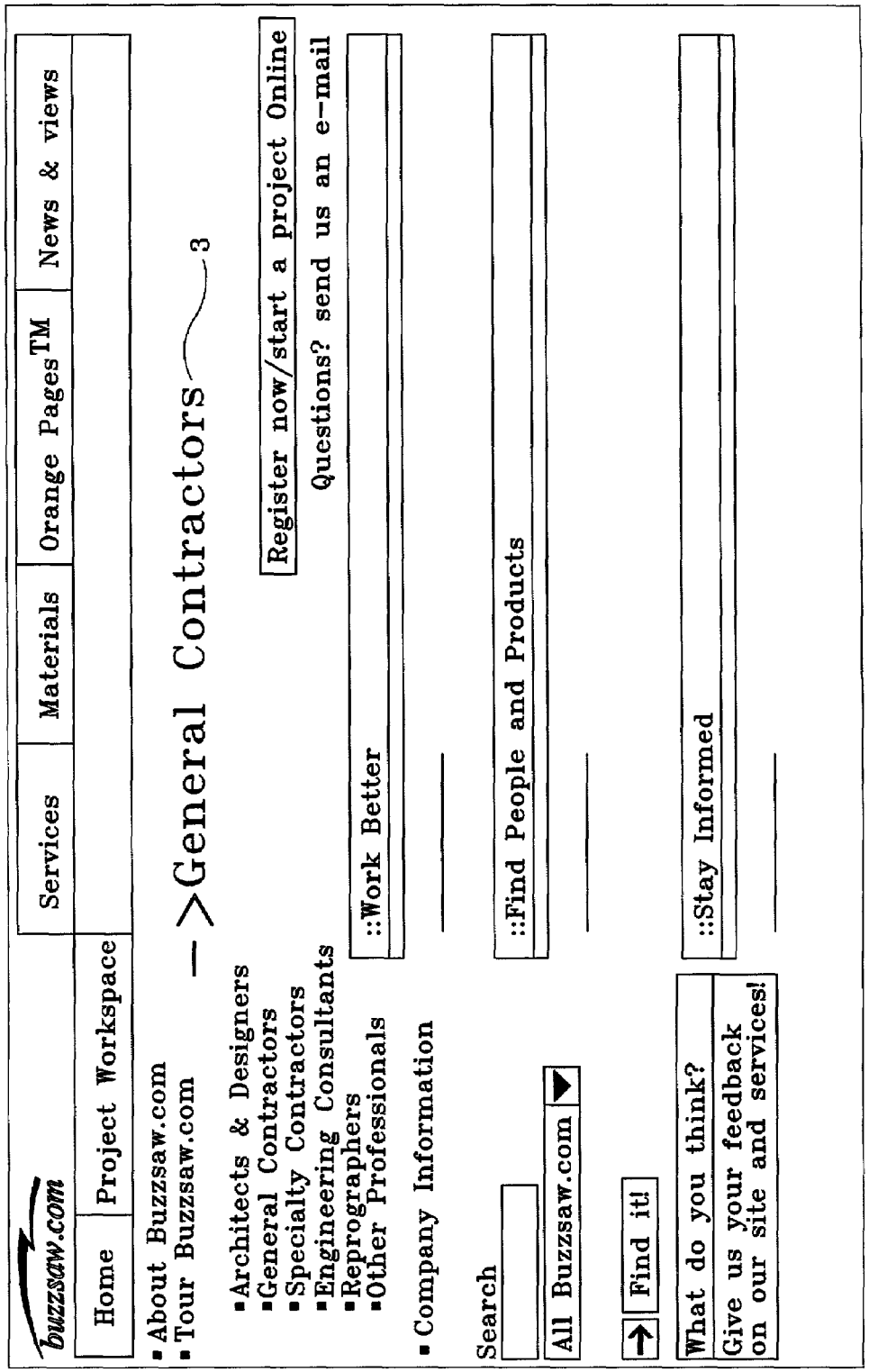
FIG. 11 shows an example web page for a portal visitor who selected a general contractor category from the web page of FIG. 10.

Referring now to FIG. 10, an example screen relating to selection of specific users is shown. In this example, if a user selects a general information link such as "About Buzzsaw.com" 95 in FIG. 5, a screen as in FIG. 10 is displayed. This screen allows a user to select services appropriate for his or her business. For example, a general contractor 3 may select the link "General Contractors" 96 on the screen of FIG. 10 and receive a screen such as FIG. 11. FIG. 11 and subsequent screens provide the general contractor user with the necessary tools and information to bid or manage a project in a user-friendly manner. The specific information resulting from this process is unique to each project and need not be discussed further for explanation of the present system.

Figure 13:
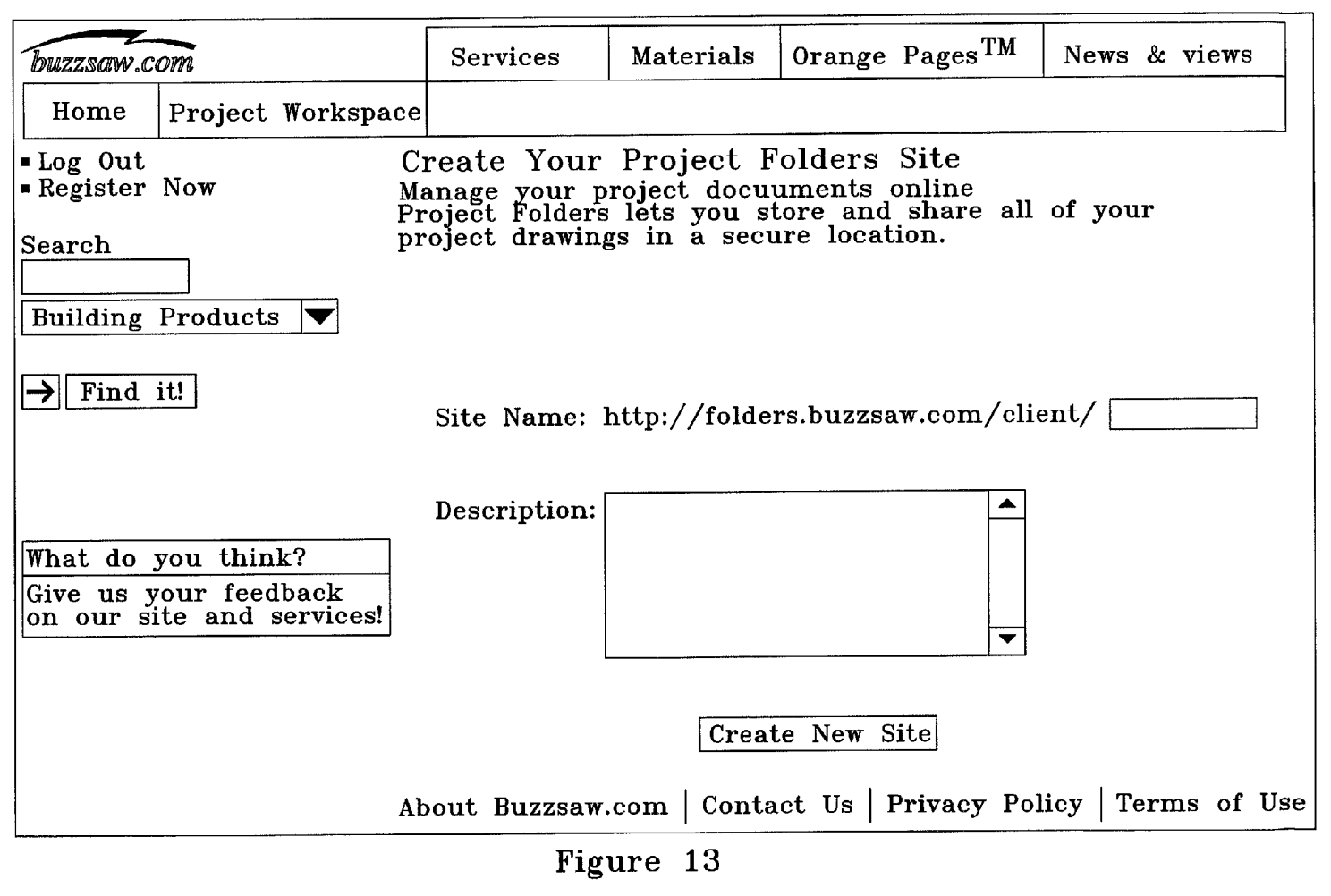

Referring now to FIGS. 12 and 13, screens appropriate for new users or members are shown. If a new user or member selects the link "Start a Project Now' 96 from the home page of FIG. 5, the screen of FIG. 12 is displayed after the new user registers on-line through several intervening screens. If a registered member selects the link "Start a Project Now' 96 from the home page of FIG. 5, the screen of FIG. 13 is displayed. FIGS. 12 and 13, and subsequent screens, provide the user, in a user-friendly manner, with the necessary tools and information to bid or manage a project. The specific information resulting from this process is unique to each project and need not be discussed further for explanation of the present system.

Figure 14:
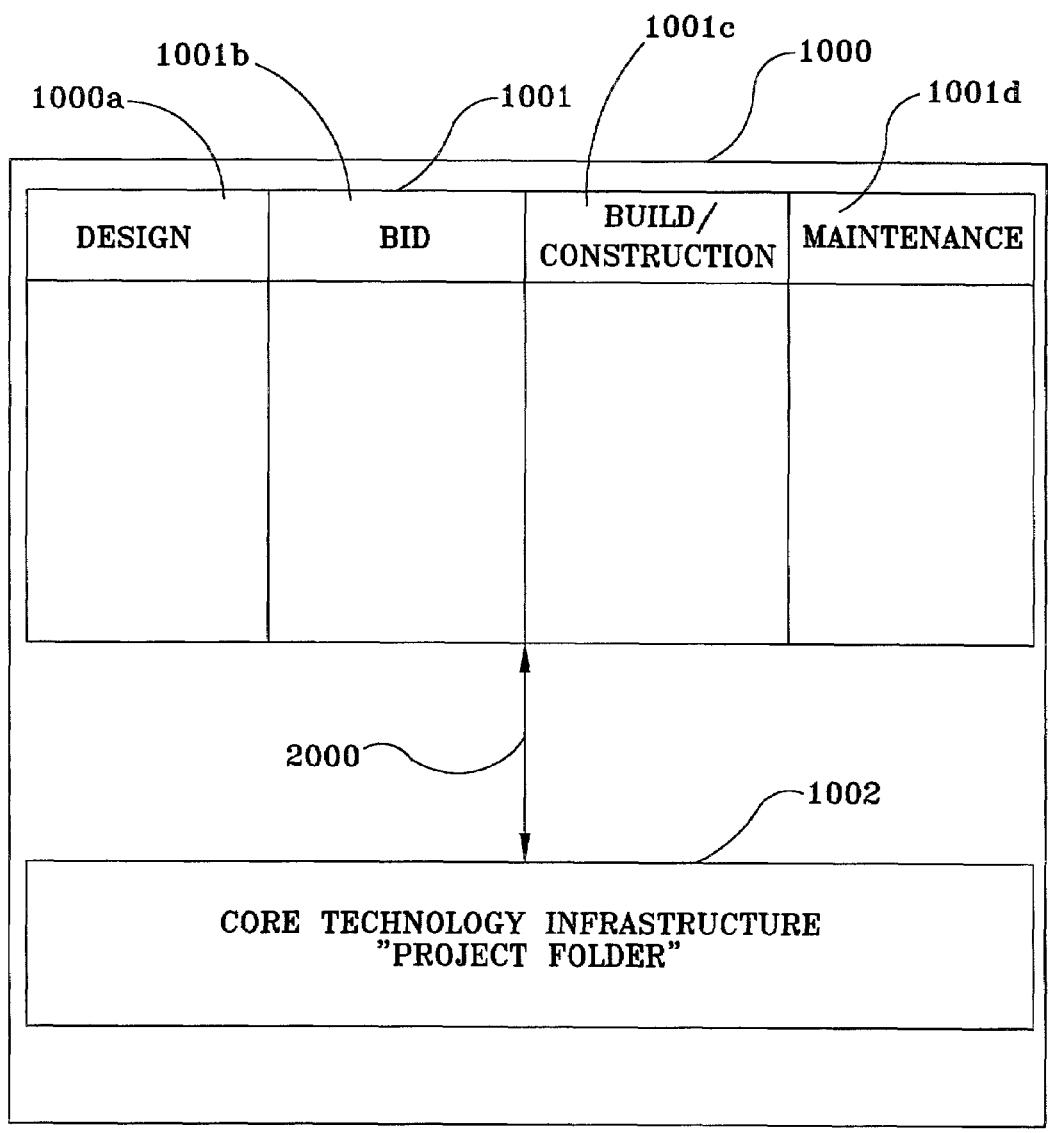
FIG. 14 shows a simplified block diagram illustrating the core technology infrastructure interface coupled to a plurality of functions related to a life-cycle of a building project including design, bidding, building or construction, and maintenance functions.
Figure 15:
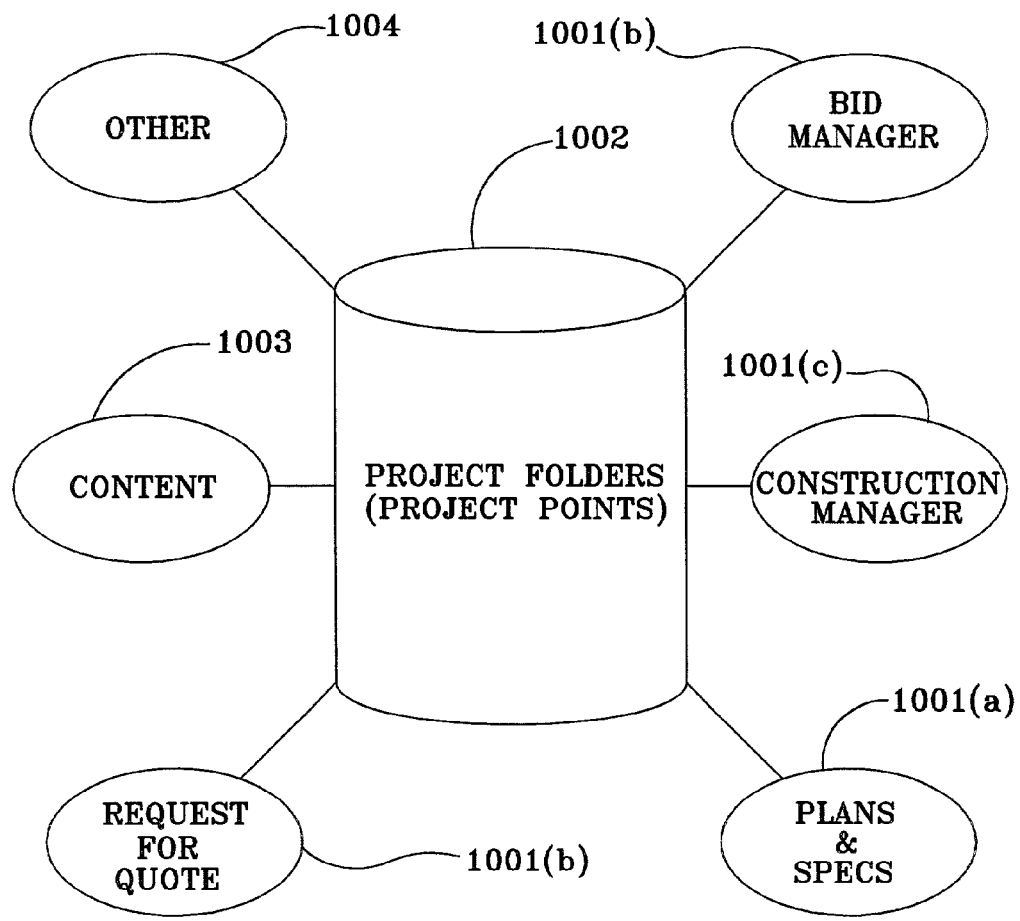
FIG. 15 shows a simplified block diagram further illustrating the core technology infrastructure in a hub-like diagram linking a plurality of functions.

As previously discussed and as illustrated in FIG. 14, the present invention also provides a global system 1000 that facilitates managing real estate, development, building and construction industries, including architecture, engineering and construction (AEC) project phases as depicted by integrated functions 1001, including design function 1001(*a*), bidding function 1001(*b*), building and construction function(s) 1001(*c*), and maintenance function 1001(*d*). The respective functions 1001(*a*), (*b*), (*c*), and (*d*) are coupled via a link 2000 to a core technology infrastructure 1002 that facilitates system services being integrated to include, by example, document management, document viewing, document redlining, account management, permissions management, contact management, design professional directories, bidding process management, construction administration management, and reprography services. FIG. 15 further illustrates the core technology infrastructure 1002 shown in a hub-like manner linking the design function 1001(*a*), bidding function 1001(*b*), building and construction function(s) 1001(*c*), maintenance function 1001(*d*), content module 1003 and miscellaneous module 1005, as may be required.

Specific details of web pages, screens, databases, management structure and hierarchies, and linkages there between, are determined by the specific software created to implement the present system. Variations necessitated by software variances from the general explanation of the processes of the present system presented above are to be expected and are included within the spirit and intent of the above specification.

Information as herein shown and described in detail is fully capable of attaining the above-described object of the invention, the presently preferred embodiment of the invention, and is, thus, representative of the subject matter which is broadly contemplated by the present invention. The scope of the present invention fully encompasses other embodiments which may become obvious to those skilled in the art, and is to be limited, accordingly, by nothing other than the appended claims, wherein reference to an element in the singular is not intended to mean "one and only one" unless explicitly so stated, but rather "one or more". All structural and functional equivalents to the elements of the above-described preferred embodiment and additional embodiments that are known to those of ordinary skill in the art are hereby expressly incorporated by reference and are intended to be encompassed by the present claims. Moreover, no requirement exists for a system or method to address each and every problem sought to be resolved by the present invention, for such to be encompassed by the present claims. Furthermore, no element, component, or method step in the present disclosure is intended to be dedicated to the public regardless of whether the element, component, or method step is explicitly recited in the claims. However, it should be readily apparent to those of ordinary skill in the art that various changes and modifications in form may be made without departing from the spirit and scope of the invention as set forth in the appended claims. No claim herein is to be construed under the provisions of 35 U.S.C. 112, sixth paragraph, unless the element is expressly recited using the phrase "means for".

I claim:

1. A computer-implemented project management system, said system comprising:

technology infrastructure means for receiving, storing, and exchanging information; and function management means, coupled to said technology infrastructure means, for managing at least one of a plurality of project functions utilizing information stored in said technology infrastructure means, said plurality of project functions comprising means for collaborating on bids between owners, architects, general contractors, subcontractors, suppliers, wholesalers and building product manufacturers, where said means for collaborating comprises:

means for preparing bid documents by architects and owners;

means for evaluating and re-packaging said bid documents into bid packages by general contractors;

means for distributing said bid packages to subcontractors by said general contractors;

means for performing quantity take-offs and soliciting request for quotes from suppliers, wholesalers and building product manufacturers by said subcontractors;

means for preparing bids by said suppliers, wholesalers and building product manufacturers and for submitting said bids to said subcontractors;

means for evaluating request for quotes and compiling bids by said subcontractors for submitting to said general contractors;

means for evaluating bids received from said subcontractors and for compiling totals into a base bid by said general contractors;

means for submitting said base bid by said general contractors to said owners and architects;

means for awarding contracts to general contractors by said owners and architects; and means for further awarding contracts to said subcontractors by said general contractors.

2. A project management system as described in claim 1 wherein said management system is facilitated by e-commerce.

3. A computer-implemented method for managing projects, said method comprising the steps of:

receiving, storing and exchanging information; and managing a plurality of project functions utilizing said information, said plurality of project functions provided for collaborating on bids between owners, architects, general contractors, subcontractors, suppliers, wholesalers and building product manufacturers, where said collaborating comprises:

preparing bid documents by architects and owners;

evaluating and re-packaging said bid documents into bid packages by general contractors;

distributing said bid packages to subcontractors by said general contractors;

performing quantity take-offs and soliciting request for quotes from suppliers, wholesalers and building product manufacturers by said subcontractors;

preparing bids by said suppliers, wholesalers and building product manufacturers and for submitting said bids to said subcontractors;

evaluating request for quotes and compiling bids by said subcontractors for submitting to said general contractors;

evaluating bids received from said subcontractors and for compiling totals into a base bid by said general contractors; and submitting said base bid by said general contractors to said owners and architects;

awarding contracts to general contractors by said owners and architects; and further awarding contracts to said subcontractors by said general contractors.

4. A method as described in claim 3 wherein said method is facilitated by utilizing e-commerce.

5. A computer-implemented bidding system for the real estate, development, building and construction industries, said system comprising:

means for preparing bid documents by architects and owners;

means for evaluating and re-packaging said bid documents into bid packages by general contractors;

means for distributing said bid packages to subcontractors by said general contractors;

means for performing quantity take-offs and soliciting request for quotes from suppliers, wholesalers and building product manufacturers by said subcontractors;

means for preparing bids by said suppliers, wholesalers and building product manufacturers and for submitting said bids to said subcontractors;

means for evaluating request for quotes and compiling bids by said subcontractors for submitting to said general contractors;

means for evaluating bids received from said subcontractors and for compiling totals into a base bid by said general contractors; and means for submitting said base bid by said general contractors to said owners and architects.

6. A bidding system as described in claim 5 wherein said system is facilitated by e-commerce.

7. A bidding system as described in claim 5 wherein said system further comprises:

means for awarding contracts to general contractors by said owners and architects; and means for further awarding contracts to said subcontractors by said general contractors.

8. A computer-implemented method for bidding real estate and construction development projects, said method comprising the steps of:

preparing bid documents by architects and owners;

evaluating and re-packaging said bid documents into bid packages by general contractors;

distributing said bid packages to subcontractors by said general contractors;

performing quantity take-offs and soliciting request for quotes from suppliers, wholesalers and building product manufacturers by said subcontractors;

preparing bids by said suppliers, wholesalers and building product manufacturers and for submitting said bids to said subcontractors;

evaluating request for quotes and compiling bids by said subcontractors for submitting to said general contractors;

evaluating bids received from said subcontractors and for compiling totals into a base bid by said general contractors; and submitting said base bid by said general contractors to said owners and architects.

9. A method as described in claim 8 wherein said method is facilitated by utilizing e-commerce.

10. A method as described in claim 8 wherein said method further comprises the steps of:

awarding contracts to general contractors by said owners and architects; and further awarding contracts to said subcontractors by said general contractors.

* * * * *